(12) United States Patent
Matsuoka et al.

(10) Patent No.: US 7,669,729 B2
(45) Date of Patent: Mar. 2, 2010

(54) TANK FOR VERY LOW TEMPERATURE LIQUIDS

(75) Inventors: Seiichi Matsuoka, Tokyo (JP); Yoji Arakawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1164 days.

(21) Appl. No.: 11/212,449

(22) Filed: Aug. 26, 2005

(65) Prior Publication Data

US 2006/0054628 A1    Mar. 16, 2006

(30) Foreign Application Priority Data

Aug. 30, 2004    (JP) ............... 2004-250829

(51) Int. Cl.
*B65D 6/40*    (2006.01)
(52) U.S. Cl. .................. 220/560.11; 220/601
(58) Field of Classification Search ............. None
See application file for complete search history.

(56) References Cited

U.S. PATENT DOCUMENTS 3,815,773 A * 6/1974 Duvall et al. ............. 220/590

5,150,812 A * 9/1992 Adams ..................... 220/589

FOREIGN PATENT DOCUMENTS

JP    2002-104297    4/2002
JP    2002-212320    7/2002

* cited by examiner

*Primary Examiner*—Stephen Castellano
(74) *Attorney, Agent, or Firm*—Haynes and Boone LLP

(57) ABSTRACT

The present invention relates to a tank for holding a cryogenic liquid. According to the present invention, there is provided a light and durable tank which is airtight even at cryogenic temperatures without generating cracks. The tank includes: a pressure-resistant layer having an inner shell and an outer shell; and an airtight resin layer on an inner surface of the inner shell, wherein the inner shell is comprised of a fiber-reinforced resin composite which can withstand temperatures above the melting point of the airtight resin layer, and the outer shell is comprised of another fiber-reinforced resin composite which can be cured at a temperature below the melting point of the airtight resin layer.

5 Claims, 9 Drawing Sheets

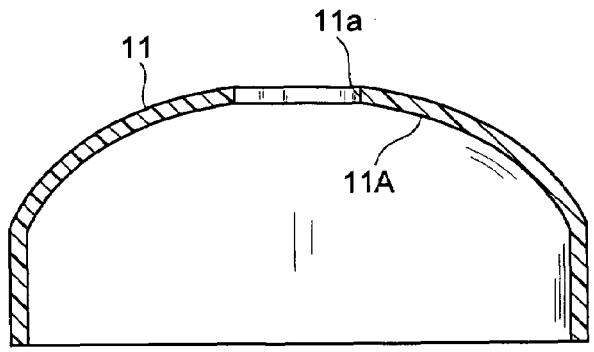
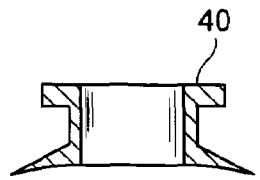
FIG. 2C
FIG. 2A
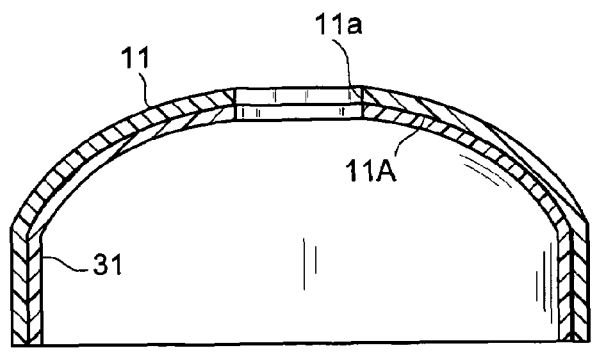
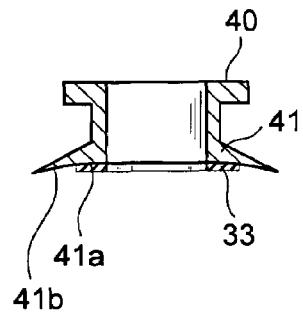
FIG. 2D
FIG. 2B

TANK FOR VERY LOW TEMPERATURE LIQUIDS

CROSS REFERENCE TO RELATED APPLICATIONS

This application claims priority under 35 U.S.C. 119 based upon Japanese Patent Application Serial No. 2004-250829, filed on Aug. 30, 2004. The entire disclosure of the aforesaid application is incorporated herein by reference.

FIELD OF THE INVENTION

The present invention relates to a tank for holding a cryogenic liquid such as liquid hydrogen, liquid oxygen and the like.

BACKGROUND OF THE INVENTION

A cryogenic liquid, such as liquid hydrogen, liquid oxygen and the like, is used as fuel for a rocket engine. Thus, a fuel tank that can withstand cryogenic temperatures plays an important role in aerospace applications. A conventional airtight tank is made of a metal; thus, its weight is heavy and manufacturing cost is high. For this reason, a composite material which is more durable and lighter than a metal has been a prime candidate for the new generation fuel tank material. However, a composite material comprised of an epoxy resin reinforced with a fiber, upon contact with a cryogenic liquid, has many micro cracks in the epoxy resin due to the difference in thermal expansion between the epoxy and the reinforcing fiber, thereby causing a fuel leak through the cracks.

In order to solve the above problem, Japanese Kokai Laid-open Publication No. 2002-104297 disclosed a technology to manufacture a light, airtight tank for holding a cryogenic liquid by bonding airtight liquid crystal polymer films with the use of an adhesive to form a liquid crystal polymer layer on the inner surface of the tank made of a composite material. Further, Japanese Kokai Laid-open Publication No. 2002-212320 disclosed a composite material, improved by means of a certain epoxy resin composition, which is resistant to crack formation even at cryogenic temperatures.

Note here that, according to the technology disclosed in the above Japanese Kokai Laid-open Publication No. 2002-104297, the liquid crystal polymer film is first cut into small pieces; these pieces are partially stuck together at the edges with respective adjacent pieces so that they can be bonded to each other through an adhesive layer; and the pieces are further bonded to the inner surface of the tank with the use of the adhesive to form the liquid crystal polymer layer.

The repetition of filling up a tank with a cryogenic liquid and discharging it means a frequent change in temperature between cryogenic and normal, thereby causing frequent contraction and expansion of the composite material comprising the tank. Thus, for the case of the tank with the liquid crystal polymer layer and the adhesive, cracks are generated in the adhesive layer connecting the liquid crystal polymer film pieces because of the difference in thermal expansion between the composite material and the adhesive. This poses a new problem, i.e. a fuel leak through the cracks in the adhesive layer. This problem occurs similarly even when the improved composite material, as disclosed in Japanese Kokai Laid-open Publication No. 2002-212320, is employed for fabricating the tank.

The entire disclosures of Japanese Kokai Laid-open Publications No. 2002-104297 and No. 2002-212320 are incorporated herein by reference.

SUMMARY OF THE INVENTION

The objective of the present invention is to provide a tank for holding a cryogenic liquid, the tank being light and durable, and airtight even at cryogenic temperatures without generating cracks in the inner surface of the tank.

In order to attain the above objective, according to a main aspect of the present invention, there is provided a tank for holding a cryogenic liquid, comprising: a pressure-resistant layer having an inner shell and an outer shell; and an airtight resin layer on an inner surface of the inner shell, wherein the inner shell is comprised of a fiber-reinforced resin composite which can withstand temperatures above the melting point of the airtight resin layer, and the outer shell is comprised of another fiber-reinforced resin composite which can be molded at a temperature below the melting point of the airtight resin layer.

The inner shell is comprised of the fiber-reinforced resin composite that can withstand temperatures above the melting point of the airtight resin layer, making it possible to form the airtight resin layer by "heat-bonding" a thermoplastic airtight resin (such as a liquid crystal polymer) onto the inner surface of the inner shell. No deformation or degradation of the inner shell occurs when the thermoplastic airtight resin is heated. Moreover, since there is no adhesive layer between the pressure-resistant layer (the inner shell) and the airtight resin layer, generation of cracks is prevented even under cryogenic conditions, and at the same time airtightness is maintained.

Further, it is possible to form the outer shell without melting the airtight resin layer that has already been formed on the inner surface of the inner shell, because the fiber-reinforced resin composite is molded to form the outer shell at a temperature below the melting point of the airtight resin layer. Moreover, the inner and outer shells are both comprised of the fiber-reinforced resin composite materials contributing to weight reduction of the tank.

The tank is preferably provided with an opening and further comprises: a joint section having a first end engaged with the opening and a second end protruding outwardly from the tank, the first end having a flange, a part of which is attached on the periphery of the opening between the inner shell and the outer shell of the pressure-resistant layer. Moreover, the tank preferably further comprises an additional airtight resin layer covering a part of the airtight resin layer, the part being the inner periphery of the opening, and the unattached part of the flange. Therefore, this layer prevents the cryogenic liquid from contacting the adhesive, which is provided to bond the inner shell and the joint section together, enhancing overall airtightness.

The airtight resin layer is preferably comprised of a plurality of thermoplastic airtight resin films bonded onto the inner surface of the inner shell.

Furthermore, the thermoplastic airtight resin film is preferably a liquid crystal polymer film. The use of the liquid crystal polymer films enhances the airtightness of the airtight resin layer.

It is preferable that the inner shell is comprised of a carbon fiber-reinforced polyimide composite, and the outer shell is comprised of a carbon fiber-reinforced epoxy composite.

Therefore, according to the present invention, since the inner shell is comprised of the fiber-reinforced resin composite that can withstand temperatures above the melting point of the airtight resin layer, it is possible to form the airtight resin layer by "heat-bonding" a thermoplastic airtight resin (such as a liquid crystal polymer) onto the inner surface of the inner shell. Moreover, since there is no adhesive layer between the pressure-resistant layer (the inner shell) and the airtight resin layer, generation of cracks is prevented even under cryogenic conditions, and at the same time airtightness is maintained. Furthermore, it is possible to form the outer shell without melting the airtight resin layer that has already been formed on the inner surface of the inner shell, because the fiber-reinforced resin composite is cured to form the outer shell at a temperature below the melting point of the airtight resin layer. Moreover, the inner and outer shells are both comprised of the fiber-reinforced resin composite materials that contribute to weight reduction of the tank.

Those skilled in the art will appreciate these and other advantages and benefits of various embodiments of the invention upon reading the following detailed description of the preferred embodiments with reference to the below-listed drawings.

BRIEF DESCRIPTION OF THE DRAWINGS

FIGS. 2A, 2B, 2C, and 2D are explanatory diagrams showing the method of manufacturing the tank of FIG. 1;

DETAILED DESCRIPTION OF THE PREFERRED EMBODIMENTS

Embodiments of the present invention are described below in accordance with accompanying drawings.

Figure 1:
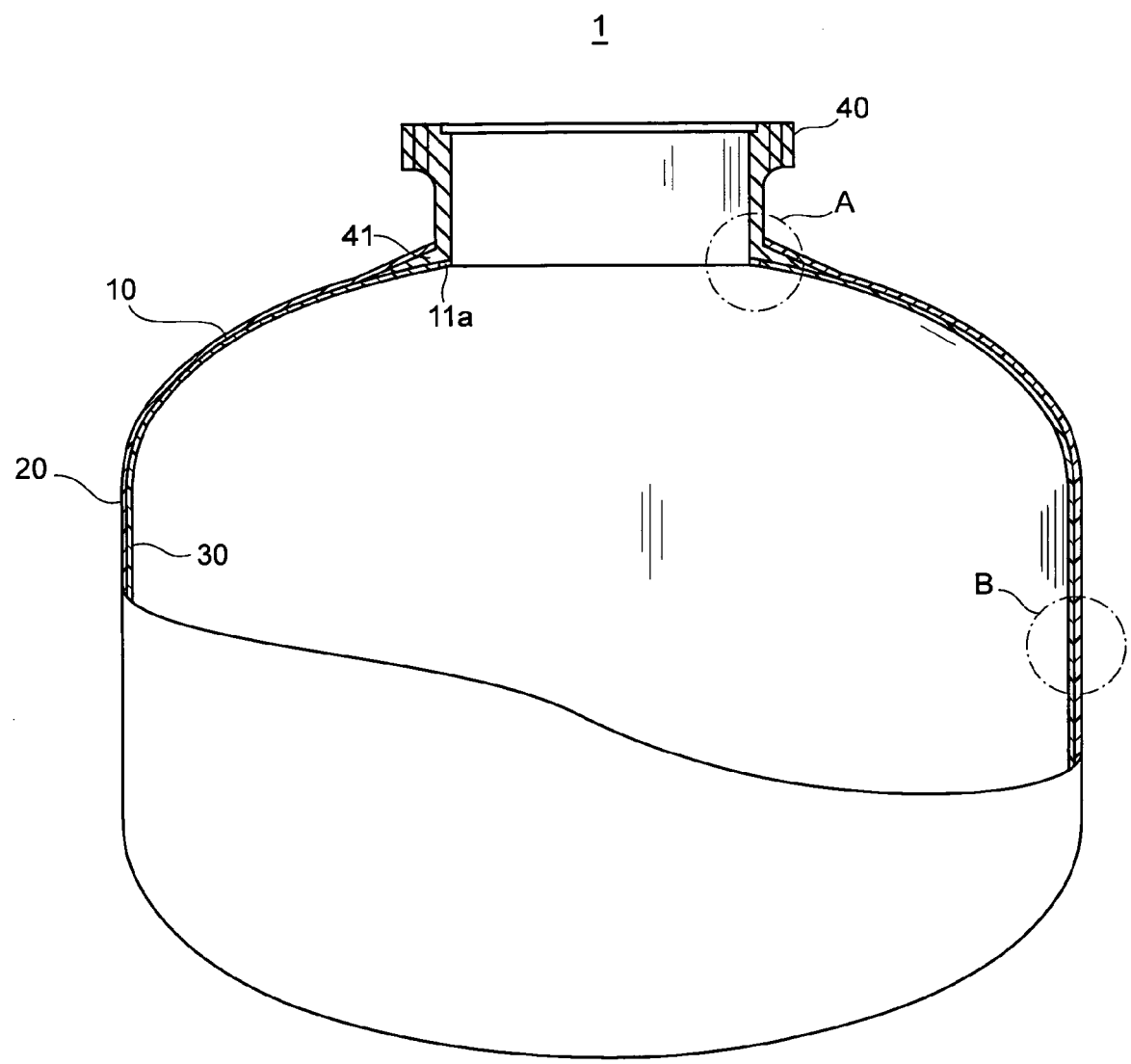
FIG. 1 shows a cross sectional view of a tank for holding a cryogenic liquid according to the present invention.

First, the structure of a tank for cryogenic liquids according to the present invention is explained with reference to the drawings. The tank 1 in FIG. 1 is for holding a cryogenic liquid such as liquid hydrogen, liquid oxygen and the like to be used as fuel for a rocket, and comprises an inner shell 10, an outer shell 20 which is provided on the outer surface of the inner shell 10, and an airtight resin layer 30 which is provided on the inner surface of the inner shell 10, and a joint section 40 which is provided in the top section of the tank.

The inner shell 10 serves for maintaining the shape of the tank, and is comprised of a fiber-reinforced resin composite material which can withstand temperatures above the melting point of the airtight resin layer 30. (That is, neither deformation nor degradation in strength occurs at the melting point of the airtight resin layer 30.) As shown in FIG. 2A, the inner layer 10 comprises an upper shell section 11 and a lower shell section 12, each of which has a shape of a dome. The upper shell section 11 has an opening 11a where the joint section 40 is mounted.

The outer shell 20 serves for resisting the pressure from the cryogenic liquid in the tank, and is comprised of a fiber-reinforced resin composite material which can be molded at a temperature lower than the melting point of the airtight resin layer 30. The inner shell 10 and the outer shell 20 together form a pressure-resistant layer in the present invention.

The airtight resin layer 30 is formed by bonding liquid crystal polymer films, which are thermoplastic airtight resin films, onto the inner surface of the inner shell 10. In particular, according to one embodiment of the present invention, the liquid crystal polymer films of a generally elongated trapezoidal shape 30a as in FIG. 5A (hereinafter referred to as a specific shape film) and of a circular shape 32b as in FIG. 6B (hereinafter referred to as a circular film) are prepared, and a plurality of these films are bonded onto the inner surface of the inner shell 10 to form the airtight resin layer 30.

Figure 3A:
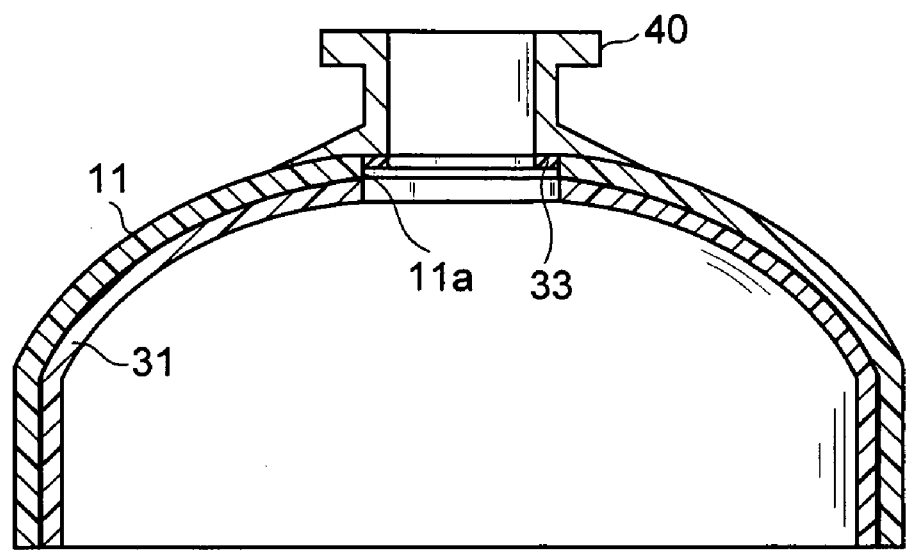
FIGS. 3A and 3B are explanatory diagrams showing the method of manufacturing the tank of FIG. 1.

As shown in FIGS. 1, 2D, and 3A, the joint section 40 comprises a circular flange 41, which is bonded with the use of an adhesive on the periphery of the opening 11a of the upper shell section 11.

In the following, a method of manufacturing the tank 1 according to the present embodiment is explained with reference to FIGS. 2-8.

First, various jigs and materials necessary for manufacturing the tank 1 are prepared (jigs and materials preparation step). Specifically, a male-type molding jig is prepared to form each of the upper and lower shell sections 11 and 12. In addition, prepared is a prepreg of a carbon fiber-reinforced polyimide composite (a base material which is made by impregnating a woven carbon fiber with a polyimide resin, and exhibits good adhesion and pliability) for forming the inner shell 10. Also prepared is a prepreg of a carbon fiber-reinforced epoxy composite (a base material which is made by impregnating a woven carbon fiber with an epoxy resin, and exhibits good adhesion and pliability) for forming the outer shell 20. Further, prepared are the specific shape films 30a for forming the airtight resin layer 30, and the circular films 32b with different diameters which are to be placed at the center of the inner surface 12A of the lower shell section 12 (FIG. 6B).

The male-type molding jig has a molding surface of a shape of a dome (a hemisphere) which corresponds to the shape of the upper and lower shell sections 11 and 12, each of which has a top portion at the top and a hem portion at the wide opening of the hemispheric shell. Also, the opening 11a is provided at the top portion of the upper shell section 11.

As for the prepregs of the carbon fiber-reinforced polyimide composite and the carbon fiber-reinforced epoxy composite, a plurality of each are prepared. In the present embodiment, CA104 (UPILEX) from Ube Industries, Ltd., which has the glass transition temperature of higher than 300° C., is selected for the carbon fiber-reinforced polyimide composite, and W-3101/Q-112j from Toho Tenax Co., Ltd. is selected for the carbon fiber-reinforced epoxy composite.

Figure 5A:
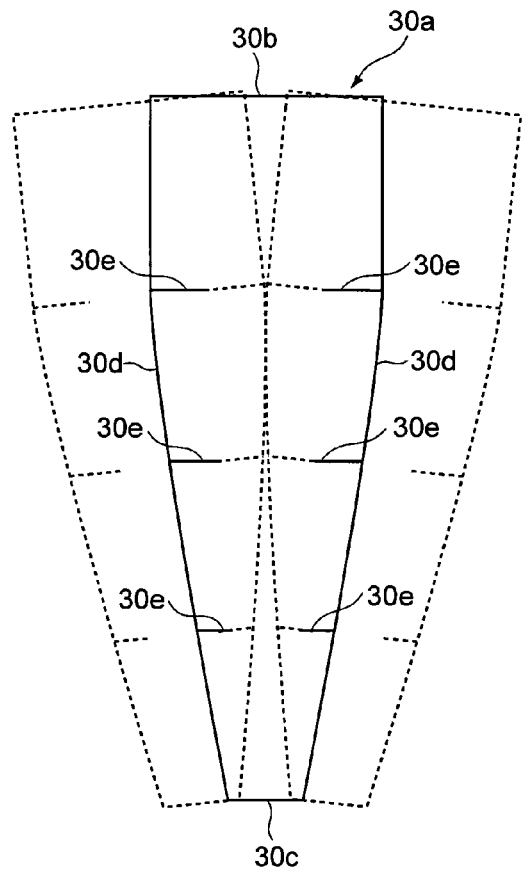
FIG. 5A shows a plan view of a specific shape film to be bonded onto the inner surface of an inner shell of the tank.

As seen in FIG. 5A, the specific shape film 30a, which is to be used for forming the air-tight resin layer 30, has a generally elongated trapezoidal shape with a long edge 30b, a short edge 30c roughly in parallel with the long edge, and two curved side edges 30d, each connecting the vertices at one end of the long edge 30b and at the corresponding end of the short edge 30c in such a way that the width of the trapezoid tapers non-linearly from the long edge 30b to the short edge 30c. The specific shape film 30a is placed on the inner surface 11A of the upper shell section 11 or 12A of the lower shell section 12, with the long edge 30b along the rim of the hem portion and the short edge 30c at the top portion. The specific shape film 30a has slits 30e which are provided laterally and symmetrically at the both side edges 30d with each length of about ¼ the width of the film at each slit.

Figure 5B:
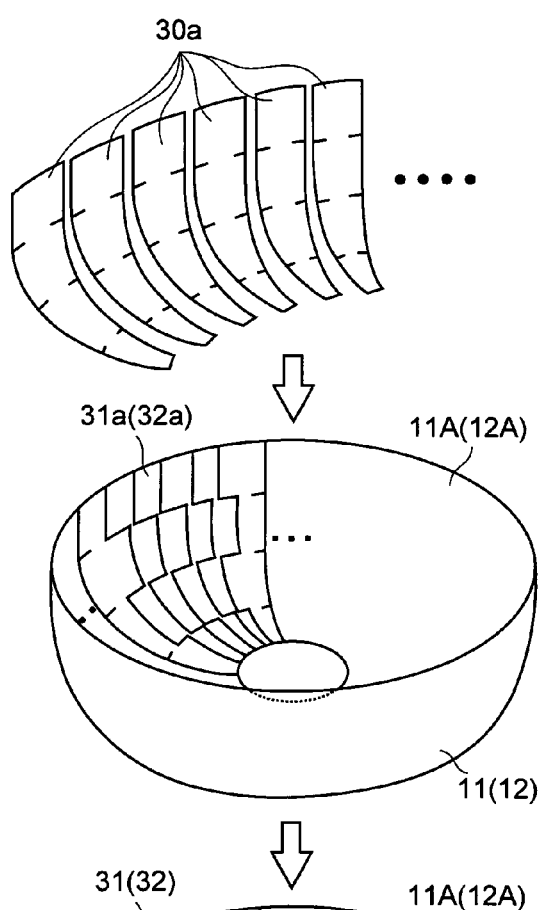
FIG. 5B are explanatory diagrams showing a process of connecting the specific shape films to construct a film body, and placing it on the inner surface of a dome-shaped shell section for heat-bonding under pressure to form a liquid crystal polymer layer.

Two specific shape films 30a can be connected together by placing the two films side-by-side and engaging the slits 30e of one film with the corresponding slits 30e of the other film so that the films are placed on top of each other alternately at the engaged slits of the connected side edge. As a result, about ½ the width of one film overlaps with the other, and the resultant connected film gradually bends toward the direction perpendicular to the original film plane as the film width tapers. As shown in FIG. 5B, a plurality of the specific shape films 30a can be connected in the above fashion, giving rise to a film body 31a (or 32a) which fits the shape of the inner surface 11A (or 12A) of the upper shell section 11 (or the lower shell section 12). Note that about ½ the width of each film overlaps with one adjacent film and the other ½ the width of the film overlaps with the other adjacent film. In the present embodiment, VecstarFA-100 from Kuraray Co., Ltd, which has the thickness of 50 μm-100 μm and the melting temperature of approximately 300° C., is selected for the liquid crystal polymer film (i.e., the specific shape film 30a and the circular film 32b).

After the jigs and materials preparation step, the upper and lower shell sections 11 and 12 for constructing the inner shell 10 are formed by employing the male-type molding jig and the prepregs of the carbon fiber-reinforced polyimide composite, as shown in FIG. 2A (inner shell forming step). Specifically, to form the upper shell section 11, a plurality of the prepregs of the carbon fiber-reinforced polyimide composite are laid on the male-type molding jig, and then they are heated and cured under pressure by use of an autoclave. The lower shell section 12 is formed in the similar manner.

In laying the prepregs on the male-type molding jig, one prepreg is stretched and laid on the dome-shaped molding surface to cover from the top portion to the hem portion so that ⅓-½ of the circumference of the hem portion is covered, and other prepregs are laid in the similar manner to cover the entire dome-shaped molding surface, resulting in the first layer contouring the dome shape. The next layer should be laid in such a way that each prepreg covers the boundary between the two adjacent prepregs in the first layer. Further, by rotating each prepreg so that the fiber direction is rotationally shifted by about 30° with respect to the fiber direction of the prepreg directly below, the resultant shell section may attain quasi-isotropy. Furthermore, when wrinkles are generated in the prepreg due to the curvature variation of the dome-shaped molding surface, a slit may be provided at the wrinkled part to stack the portions of the prepreg around the slit to contour the dome shape. The number of the prepreg layers should be the minimum (e.g. 3-5 layers) required for maintaining the shape of the tank.

Next, as shown in FIG. 2B, an upper liquid crystal polymer layer 31 is formed by bonding the specific shape films 30a onto the inner surface of the upper shell section 11, and a lower liquid crystal polymer layer 32 is formed by bonding the specific shape films 30a and the circular films 32b onto the inner surface of the lower shell section 12 (upper and lower liquid crystal polymer layers forming step).

Figure 6A:
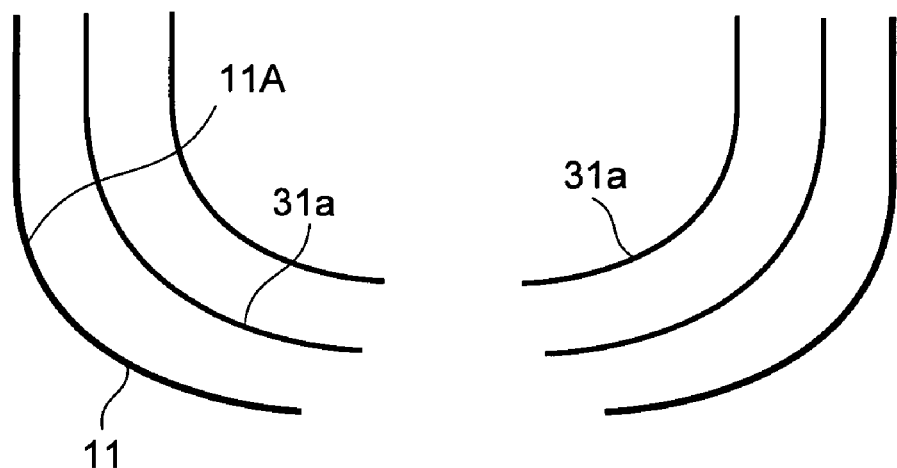
FIG. 6A is an explanatory diagram showing the film bodies placed on an upper shell section of the inner shell of the tank of FIG. 1.
Figure 6B:
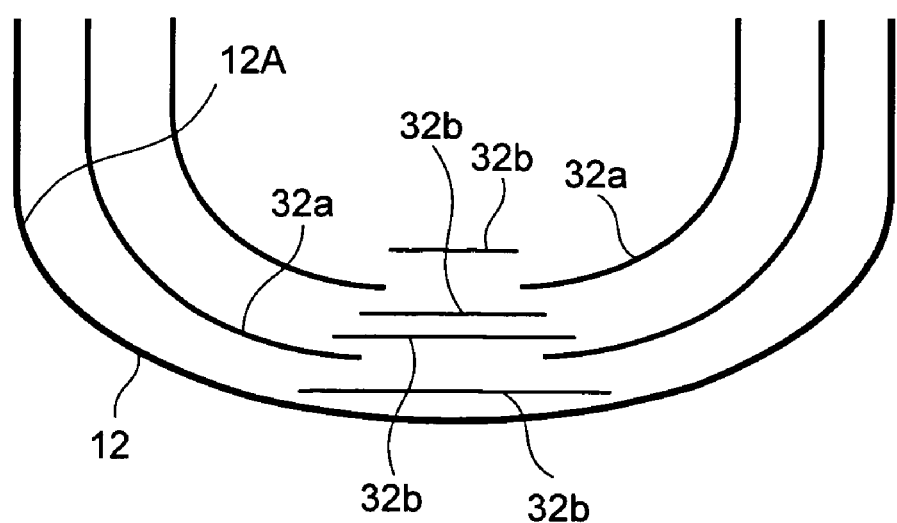
FIG. 6B is an explanatory diagram showing the film bodies and circular films placed on a lower shell section of the inner shell of the tank of FIG. 1.
Figure 7A:
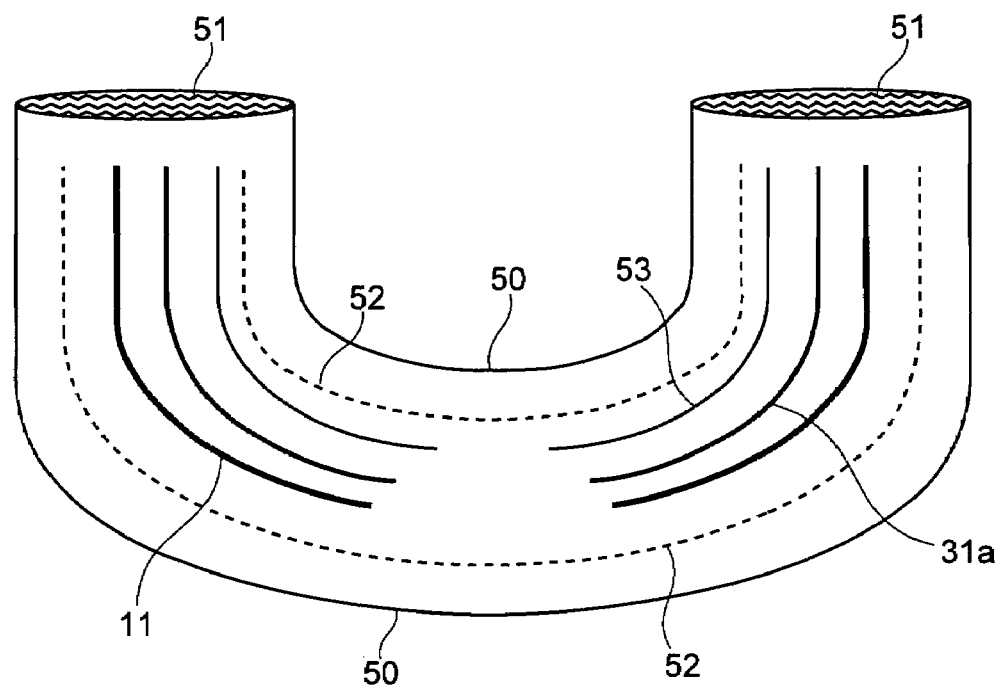
FIG. 7A is an explanatory diagram showing the method of bonding the film bodies onto the upper shell section.

Specifically, two layers of the film body 31a are placed on the inner surface 11A of the upper shell section 11, as shown in FIGS. 5B and 6A. Thereafter, as shown in FIG. 7A, the upper shell section 11 and the two layers of the film body 31a are covered with a polyimide film 50 and sealed with a sealant 51. The resultant structure is then heated for about 15 minutes at a temperature below and close to the melting point of the liquid crystal polymer film (e.g. 260-299° C.) with the pressure of 0.3 MPa by use of an autoclave while vacuum pumping. The upper liquid crystal polymer layer 31 is thus formed as a result of the film bodies 31a being bonded onto the inner surface 11A of the upper shell section 11.

Figure 7B:
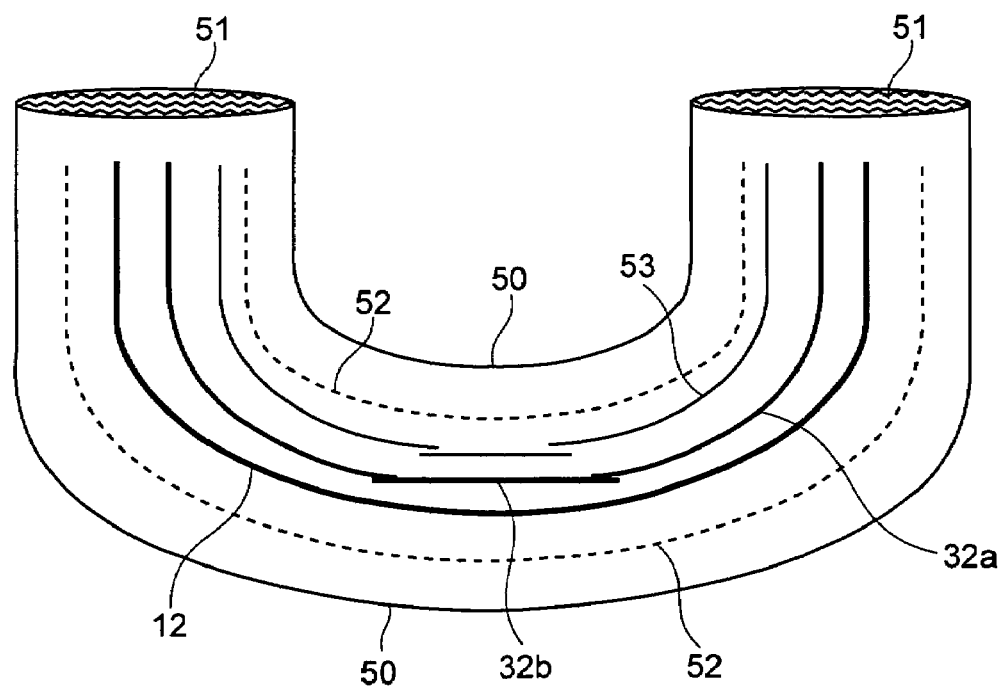
FIG. 7B is an explanatory diagram showing the method of bonding the film bodies and circular films onto the lower shell section.

Similarly, two layers of the film body 32a are placed on the inner surface 12A of the lower shell section 12, as shown in FIGS. 5B and 6B. Additionally, as shown in FIG. 6B, a plurality of the circular films 32b are placed on the inner surface 12A at the center of the top portion of the lower shell section 12. Thereafter, as shown in FIG. 7B, the lower shell section 12, the two layers of the film body 32a, and the circular films 32b are covered with a polyimide film 50 and sealed with a sealant 51. The resultant structure is then heated for about 15 minutes at a temperature below and close to the melting point of the liquid crystal polymer film (e.g. 260-299° C.) with the pressure of 0.3 MPa by use of an autoclave while vacuum pumping. The lower liquid crystal polymer layer 32 is thus formed as a result of the film bodies 32a and the circular films 32b being bonded onto the inner surface 12A of the upper shell section 12.

The temperature range of 260° C.-299° C. given in the above upper and lower liquid crystal polymer layer forming step is below and close to the melting point of the liquid crystal polymer films. Thus, in this temperature range, the liquid crystal polymer films maintain the original functions, but soften to bond to the inner shell 10 and to each other. Further, since this temperature range is below the temperature at which a polyimide resin gets deformed, neither deformation nor degradation in strength of the inner shell 10 occurs.

In the above process, as shown in FIG. 7A (or 7B), a glass cloth 52 may be placed between the outer surface of the upper shell section 11 (or the lower shell section 12) and the polyimide film 50. Further, an aluminum film 53 may be placed on the film bodies 31a (or the film bodies 32a and the circular films 32b), and another glass cloth 52 may be placed between the aluminum film 53 and the polyimide film 50.

Next, the joint section 40 made of a titanium alloy is fabricated as shown in FIG. 2C (joint section fabrication step). This joint section is to be attached at the opening 11a of the upper shell section 11. A joint section liquid crystal polymer layer 33 is formed by bonding a liquid crystal polymer film onto an inner bottom portion 41a of the flange 41 of the joint section 40, as shown in FIG. 2D (joint section liquid crystal polymer layer forming step).

Figure 8A:
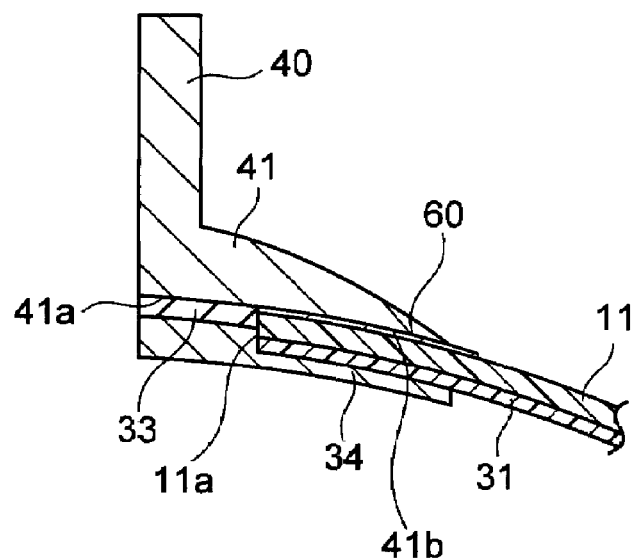
FIG. 8A is an expanded view of the section A of FIG. 1.

Next, as shown in FIG. 3A, the joint section 40 is mounted to the opening 11a of the upper shell section 11 (joint section attaching step). In this step, as shown in FIG. 8A, an outer bottom portion 41b of the flange 41 is bonded to the upper shell section 11 at the periphery of the opening 11a with the use of an adhesive 60. In the present embodiment, an epoxy film adhesive, AF163-2K from 3M, is selected for the adhesive 60, and it is heated at 120° C. for bonding by use of an autoclave. Note that, since the inner diameter of the joint section 40 is smaller than the diameter of the opening 11a, the joint section liquid crystal polymer layer 33, which is formed on the inner bottom portion 41a of the flange 41, gets exposed.

Figure 3B:
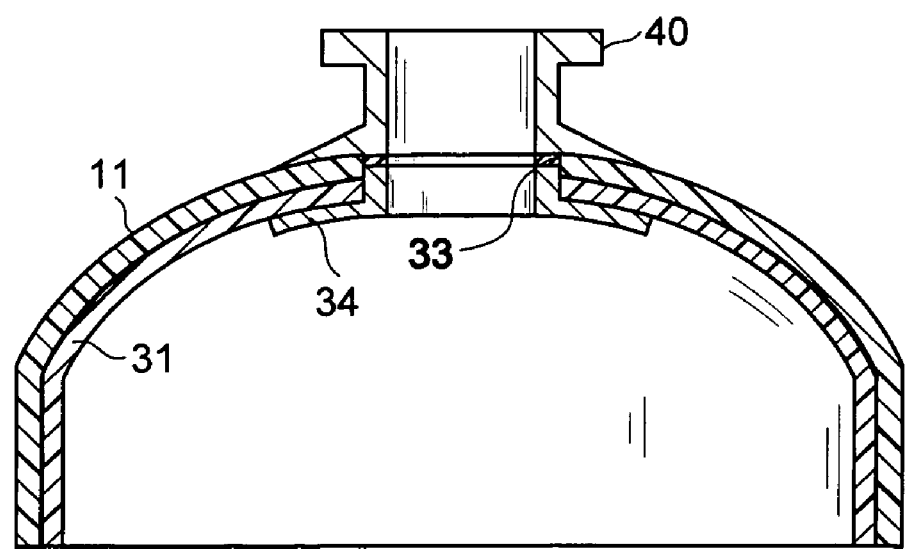

Next, as shown in FIGS. 3B and 8A, a joint section attaching part liquid crystal polymer layer 34 is formed by bonding a liquid crystal polymer film onto the joint section liquid crystal polymer layer 33 and the inner part of the upper liquid crystal polymer layer 31 around the opening 11a so as to cover the area (joint section attaching part liquid crystal polymer layer forming step). In this case, the liquid crystal polymer film is partially heated and melted by use of a soldering iron and the like. The joint section attaching part liquid crystal polymer layer 34 serves as a joint section attaching part airtight resin layer in the present invention.

Figure 4A:
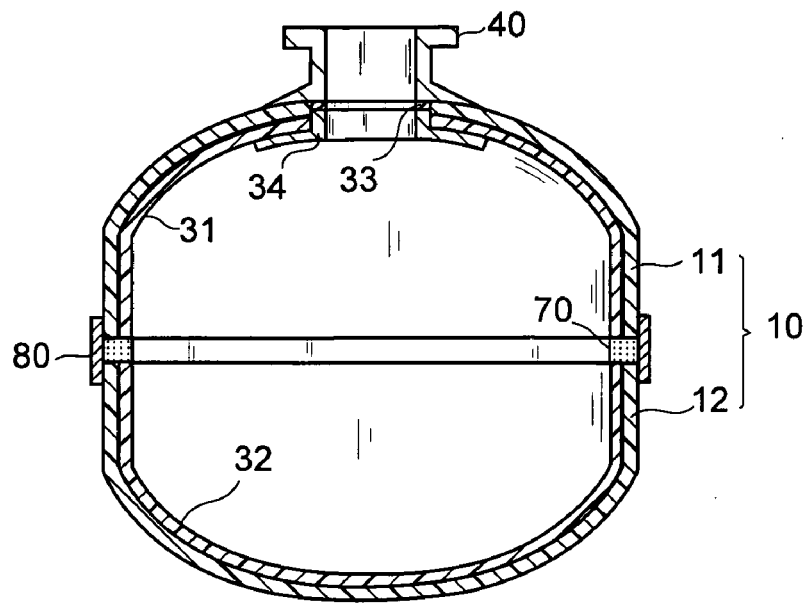
FIGS. 4A, 4B, and 4C are explanatory diagrams showing the method of manufacturing the tank of FIG. 1.
Figure 8B:
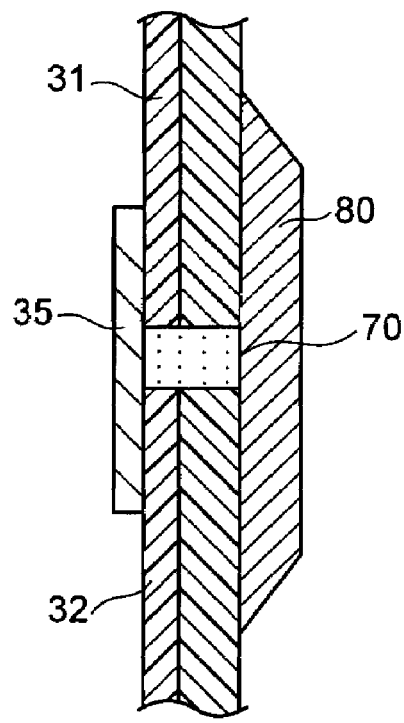
FIG. 8B is an expanded view of the section B of FIG. 1.

Next, as shown in FIGS. 4A and 8B, the upper and lower shell sections 11 and 12 are bonded together at the rims with the use of an adhesive 70 so as to form the inner shell 10, and the outer side of the bonded part is wrapped around with a reinforcement band 80 (upper and lower shell sections bonding step). In the present embodiment, a room temperature epoxy adhesive, EA934NA from Loctite Corp., is selected for the adhesive 70. Also, a composite material comprised of a woven carbon fiber impregnated with EA934NA is used for the reinforcement band 80.

Figure 4B:
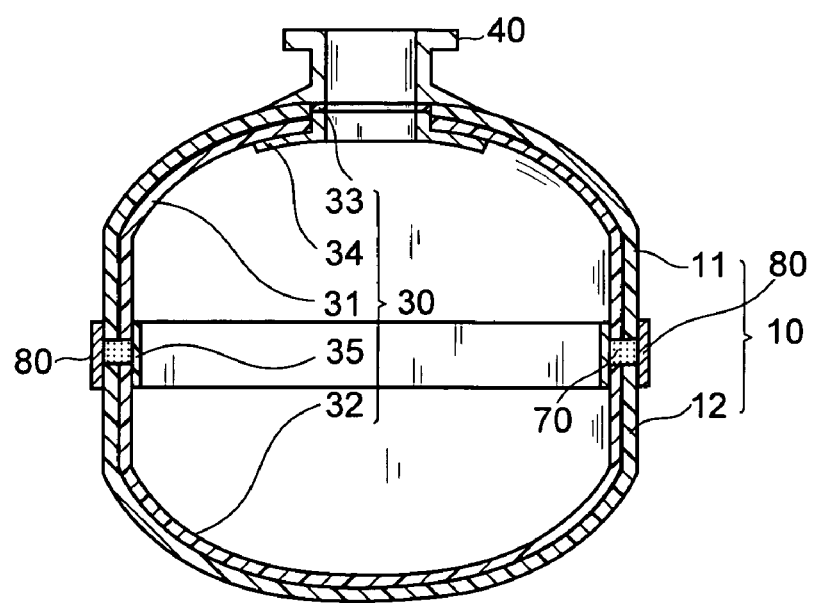

Next, as shown in FIGS. 4B and 8B, an upper and lower shell sections bonding part liquid crystal polymer layer 35 is formed by bonding a liquid crystal polymer film onto the inner side of the bonded part of the upper and lower shell sections 11 and 12 (upper and lower shell sections bonding part liquid crystal polymer layer forming step). In this case also, the liquid crystal polymer film is partially heated and melted by use of a soldering iron and the like. The upper and lower shell sections bonding part liquid crystal polymer layer 35 covers a gap between the upper and lower liquid crystal polymer layers 31 and 32, the gap having no crystal liquid polymer film, thereby enhancing overall air-tightness. It should be noted that while FIGS. 8A and 8B show expanded views of the respective sections A and B of FIG. 1, those expanded views omit showing the outer shell 20 for clarity, and they further show details of the liquid crystal polymer layers 31, 32, 33, 34, 35; opening 11a of the upper shell section 11; adhesives 60 and 70; and reinforcing band 80 that are too small to be shown in the view of FIG. 1

Figure 4C:
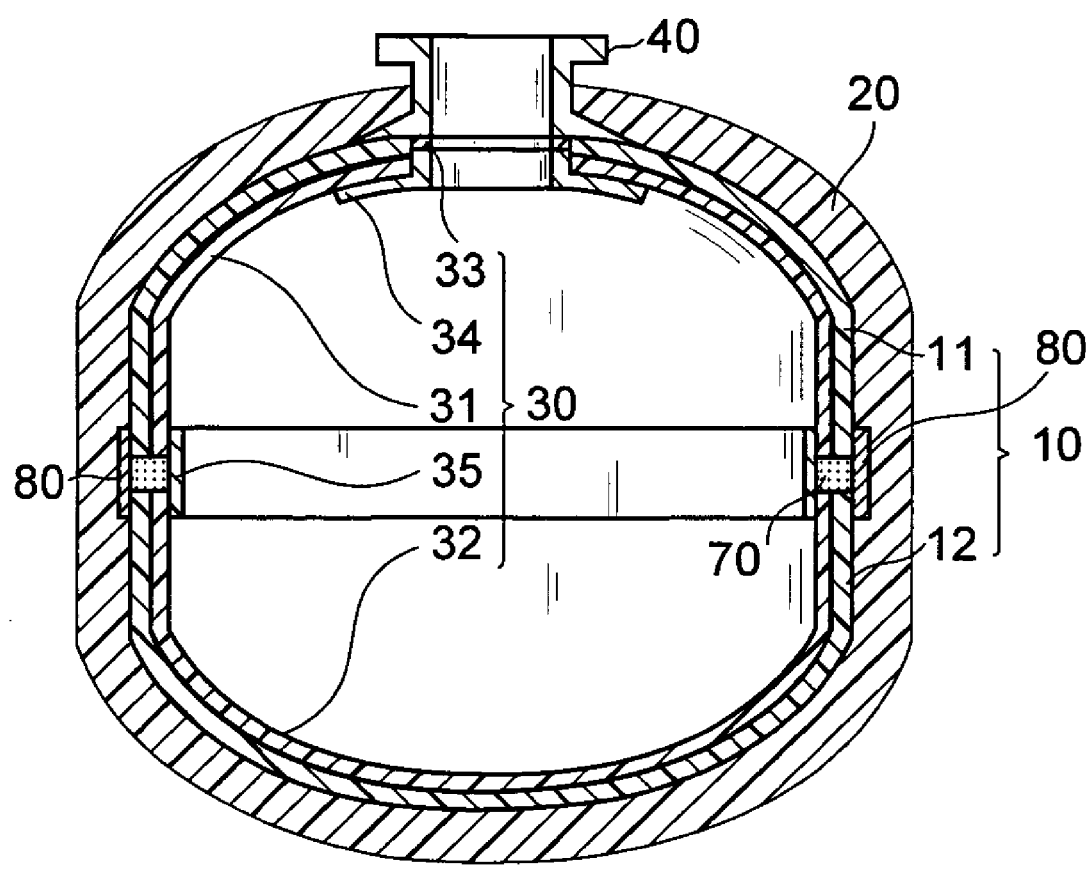

Next, as shown in FIG. 4C, the outer shell 20 is formed by use of the prepregs of the carbon fiber-reinforced epoxy composite (outer shell forming step). Specifically, a plurality of the prepregs of the carbon fiber-reinforced epoxy composite are laid on the outer surface of the inner shell 10, and are heated and cured under pressure by use of an autoclave to form the outer shell 20.

In laying the prepregs on the inner shell 10, one prepreg is stretched and laid on the inner shell surface to cover from the top portion to the bottom portion so that ⅓-½ of the circumference is covered, and other prepregs are laid in the similar manner to cover the entire inner shell surface to thereby result in the first layer contouring the inner shell surface. The next layer should be laid in such a way that each prepreg covers the boundary between the two adjacent prepregs in the first layer. Further, by rotating each prepreg so that the fiber direction is rotationally shifted by about 30° with respect to the fiber direction of the prepreg directly below, the resultant outer shell may attain quasi-isotropy. Furthermore, when wrinkles are generated in the prepreg due to the curvature variation of the inner shell surface, a slit may be provided at the wrinkled part to stack the portions of the prepreg around the slit to contour the inner shell surface. The number of the prepreg layers should be the minimum required for withstanding the pressure from the cryogenic liquid in the tank.

The tank 1 for cryogenic liquids, according to the present invention, is thus manufactured by following the above processing steps. As shown in FIG. 4C, the airtight resin layer 30 comprises the upper liquid crystal polymer layer 31, the lower liquid crystal polymer layer 32, the joint section liquid crystal polymer layer 33, the joint section attaching part liquid crystal polymer layer 34, and the upper and lower shell sections bonding part liquid crystal polymer layer 35.

According to the present embodiment, the inner shell 10 is comprised of the carbon fiber-reinforced polyimide composite that can withstand temperatures above the melting point of the liquid crystal polymer films, making it possible to form the airtight resin layer 30 by "heat-bonding" the liquid crystal polymer films (the specific shape films 30a and the circular films 32b) onto the inner surface of the inner shell 10. No deformation or degradation of the inner shell 10 occurs when the liquid crystal polymer films are heated. Moreover, since there is no adhesive layer between the pressure-resistant layer (the inner shell) and the airtight resin layer 30, generation of cracks is prevented even under cryogenic conditions, and at the same time airtightness is maintained.

Further, according to the present embodiment, it is possible to form the outer shell 20 without melting the airtight resin layer 30 that has already been formed on the inner surface of the inner shell 10, because the carbon fiber-reinforced epoxy composite is cured to form the outer shell 20 at a temperature below the melting point of the airtight resin layer 30. Moreover, the inner and outer shells 10 and 20 are both comprised of the fiber-reinforced resin composite materials contributing to weight reduction of the tank 1.

Furthermore, according to the present embodiment, the joint section attaching part liquid crystal polymer layer 34 is formed to cover a part of the airtight resin layer 30, the part being the inner periphery of the opening 11a, and the unattached part of the flange 41, thereby preventing the cryogenic liquid from contacting the adhesive 60, which is provided to bond the inner shell 10 and the joint section 40 together, and enhancing overall airtightness.

Furthermore, according to the manufacturing method of the tank 1 in the present embodiment, in the upper and lower liquid crystal polymer layer forming step, the specific shape films 30a and the circular films 32b are heat-bonded at a temperature below and close to the melting point of these films (e.g. 260° C.-299° C.) so that the films do not melt completely, and firm bonding can be realized.

Furthermore, according to the manufacturing method of the tank 1 in the present embodiment, the film bodies 31a and 32a are made to fit the inner surface 11A of the upper shell section 11 and the inner surface 12A of the lower shell section 12, respectively, by first making a plurality of the specific shape films 30a, each having a generally elongated trapezoidal shape with the long edge 30b, the short edge 30c roughly in parallel with the long edge, and two curved side edges 30d, with slits 30e provided laterally and symmetrically at the both side edges 30d, and by engaging the slits 30e of each film with the corresponding slits 30e of adjacent films. Thereafter, the film bodies 31a and 32a are heated under pressure so that the films are bonded onto the respective inner surfaces, thereby forming the upper and lower liquid crystal polymer layers 31 and 32. That is, the film bodies 31a and 32a can be formed by connecting the specific films 30a so as to fit the respective inner surfaces, and the resultant film bodies, which are comprised of a non-adhesive thermoplastic resin, can be laid on the respective inner surfaces without the aid of a scotch tape and the like.

Furthermore, since the specific films 30a are connected and overlapped with each other via the slits, the overlapped parts slide against each other during heating under pressure, and thus the overall shapes of the film bodies 31a and 32a get adjusted to contour the respective inner surfaces. Therefore, bonding of these film bodies onto the respective inner surfaces can be carried out almost flawlessly. Moreover, the specific shape films 30a are of an identical shape, enabling a mass production. Also, it is easy to provide the films with the slits 30e and to engage the slits of one film with the corresponding slits of another film; thus, it does not require much labor to form the film bodies 31*a* and 32*a*.

Furthermore, according to the manufacturing method in the present embodiment, since the slits 30*e* are provided laterally and symmetrically at the both side edges 30*d* with each length of about ¼ the width of the film at each slit, about ½ the width of each film overlaps with one adjacent film and the other ½ the width of the film overlaps with the other adjacent film. Therefore, variation in thickness of the film bodies 31*a* and 32*a* becomes negligible.

Although the carbon-fiber reinforced polyimide composite is used for the inner shell 10 in the present embodiment, any other fiber-reinforced resin composite may be used as long as it can withstand temperatures above the melting point of the airtight resin layer 30. In addition, although the carbon-fiber reinforced epoxy composite is used for the outer shell 20 in the present embodiment, any other fiber-reinforced resin composite may be used as long as it can be molded at a temperature below the melting point of the airtight resin layer 30. Moreover, although the present embodiment employs the carbon fiber-reinforced type composites, it is possible to use resin composites with other type of fiber reinforcement such as glass fiber, aramid fiber, and the like.

Furthermore, according to the present invention, the specific shape film 30*a* has a generally elongated trapezoidal shape with the long edge 30*b*, the short edge 30*c* roughly in parallel with the long edge, and two curved side edges 30*d*. However, the shape of the specific film 30*a* is not limited to the above. For example, a generally elongated isosceles triangle having two long edges with roughly the same length and a short edge may be employed.

Although the airtight resin layer 30 is made by bonding the liquid crystal polymer films onto the inner surface of the inner shell 10 in the present embodiment, other type of thermoplastic airtight resin films may be employed for the formation of the airtight resin layer 30.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A tank for holding a cryogenic liquid, comprising:
a pressure-resistant layer having an inner shell and an outer shell; and
an airtight resin layer on an inner surface of the inner shell,
wherein the inner shell is comprised of a fiber-reinforced resin composite which can withstand temperatures above a melting point of the airtight resin layer, and
the outer shell is comprised of another fiber-reinforced resin composite which can be cured at a temperature below the melting point of the airtight resin layer, and
wherein the tank has an opening at a portion of the tank and said tank further comprises:
a joint section having a first end engaged with the opening and a second end protruding outwardly from the tank, the first end having a flange, a part of which is attached at a periphery of the opening between the inner shell and the outer shell of the pressure-resistant layer; and
an additional airtight resin layer covering a portion of said airtight resin layer, said portion of said airtight resin layer being at an inner periphery of the opening and at an unattached part of the flange.

2. The tank as claimed in claim 1, wherein
the airtight resin layer is comprised of a plurality of thermoplastic airtight resin films bonded onto the inner surface of the inner shell.

3. The tank as claimed in claim 2, wherein
the thermoplastic airtight resin film is a liquid crystal polymer film.

4. The tank as claimed in claim 1, wherein
the inner shell is comprised of a carbon fiber-reinforced polyimide composite, and the outer shell is comprised of a carbon fiber-reinforced epoxy composite.

5. The tank as claimed in claim 1, wherein
the inner shell comprises an upper shell section in which the opening is arranged and a lower shell section bonded to the upper shell section at a rim thereof, each of which has a shape of a dome, and
the tank further comprising:
a third airtight resin layer fused onto an inner side of the bonded portion of the upper and lower shell sections.

* * * * *